Figure 1:
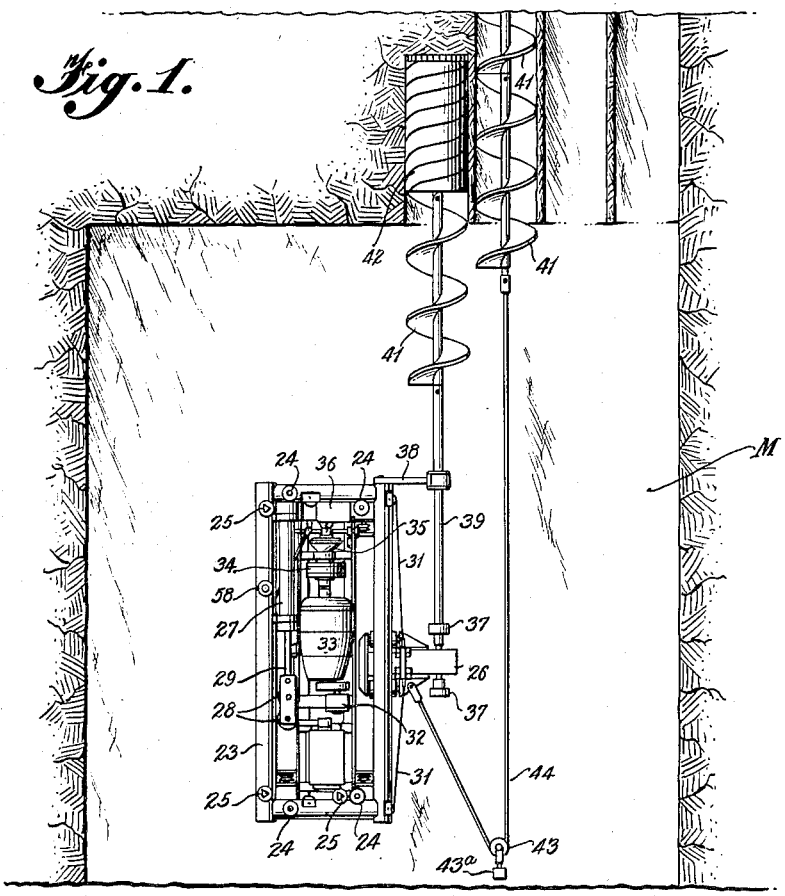

Dec. 28, 1954  D. G. FAWKES  2,698,169
UNDERGROUND COAL AUGER MACHINE
Filed April 17, 1952  9 Sheets-Sheet 1

INVENTOR.
Donald G. Fawkes
BY
ATTORNEY

Dec. 28, 1954

D. G. FAWKES 2,698,169

UNDERGROUND COAL AUGER MACHINE

Filed April 17, 1952

9 Sheets-Sheet 2

INVENTOR
Donald G. Fawkes
BY
ATTORNEY

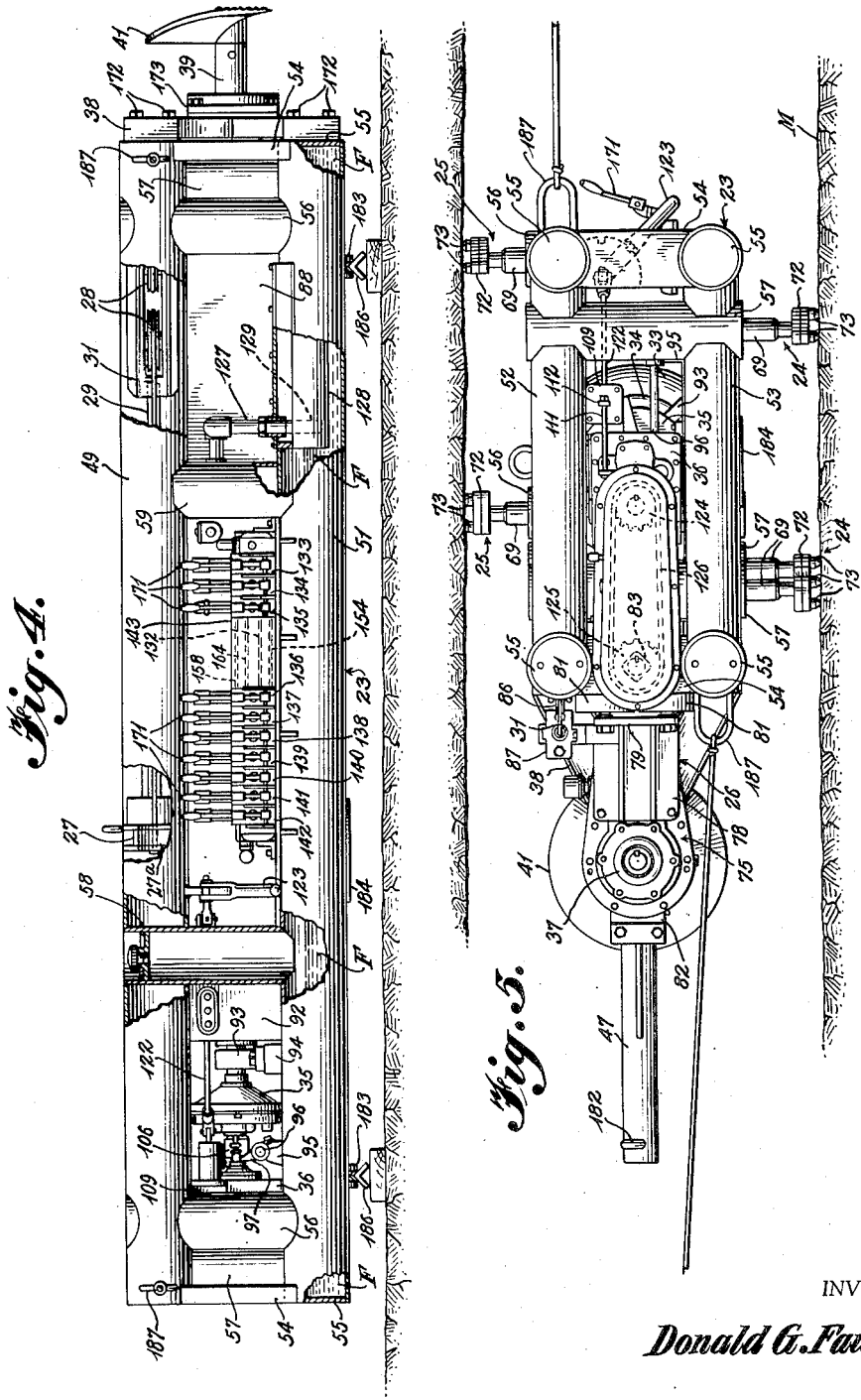

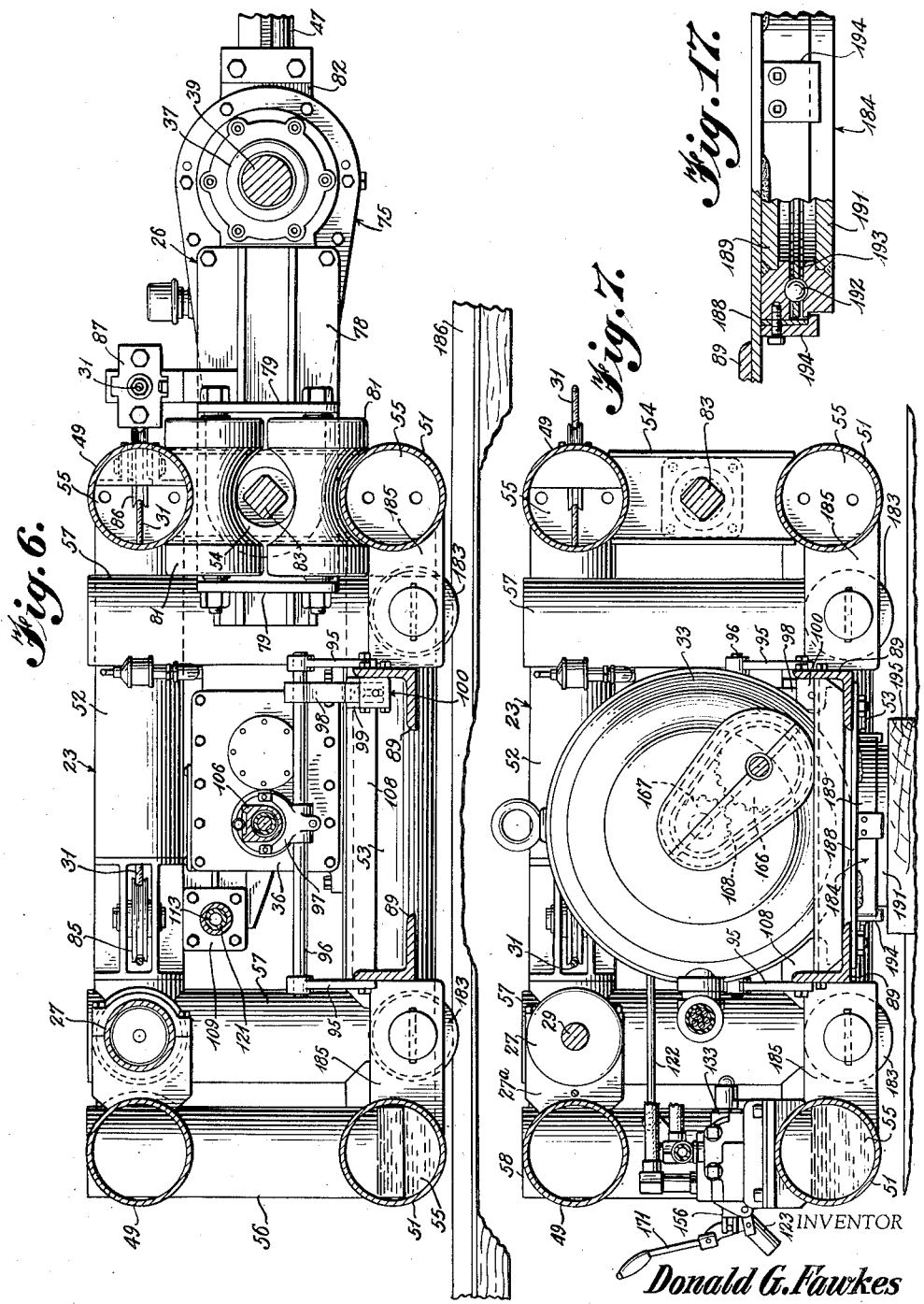

Dec. 28, 1954     D. G. FAWKES     2,698,169
UNDERGROUND COAL AUGER MACHINE
Filed April 17, 1952     9 Sheets-Sheet 5
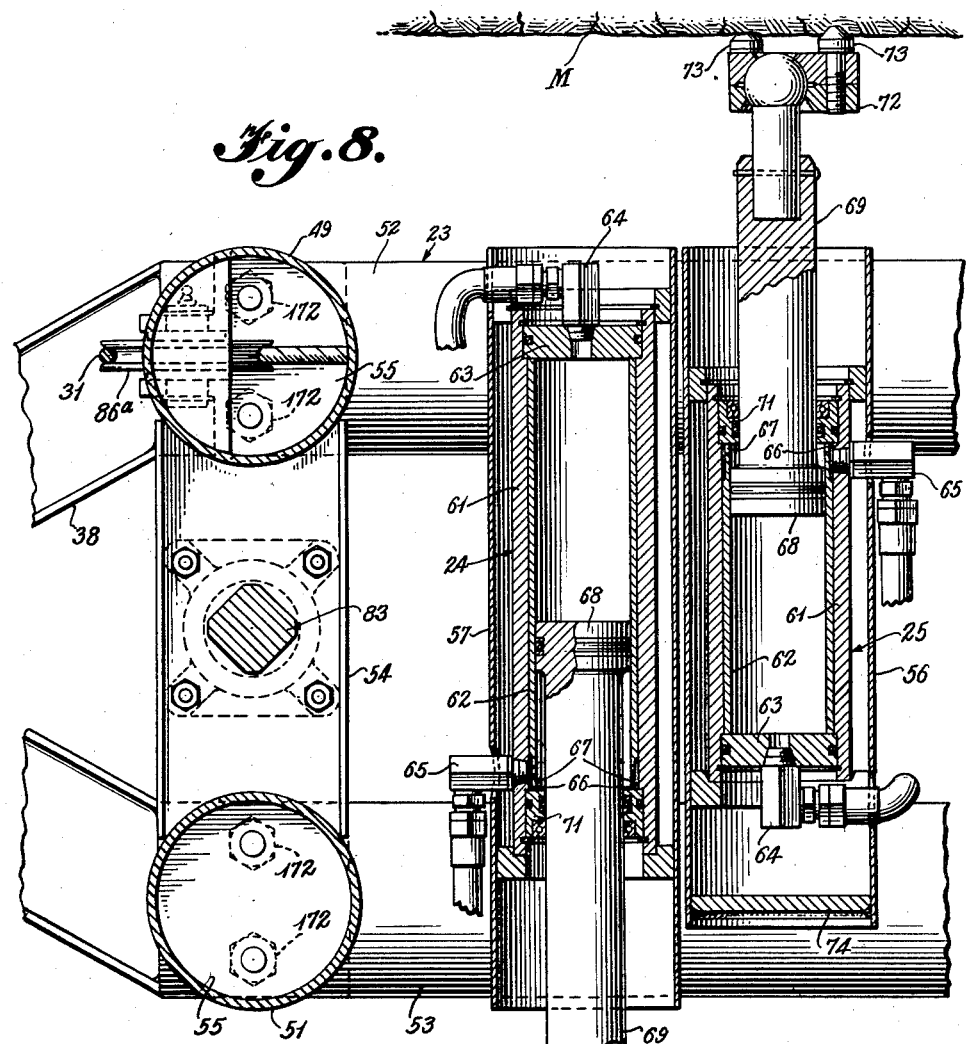
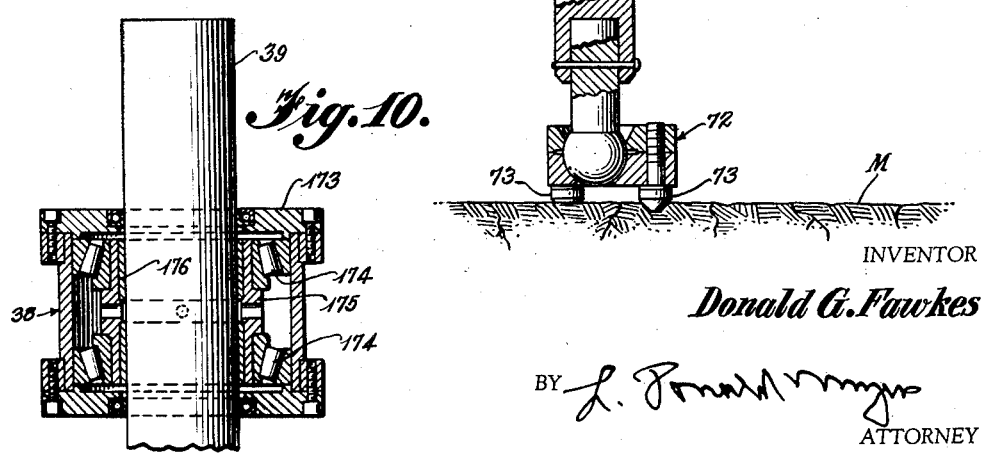
INVENTOR
Donald G. Fawkes
BY
ATTORNEY Dec. 28, 1954   D. G. FAWKES   2,698,169
UNDERGROUND COAL AUGER MACHINE
Filed April 17, 1952   9 Sheets-Sheet 6
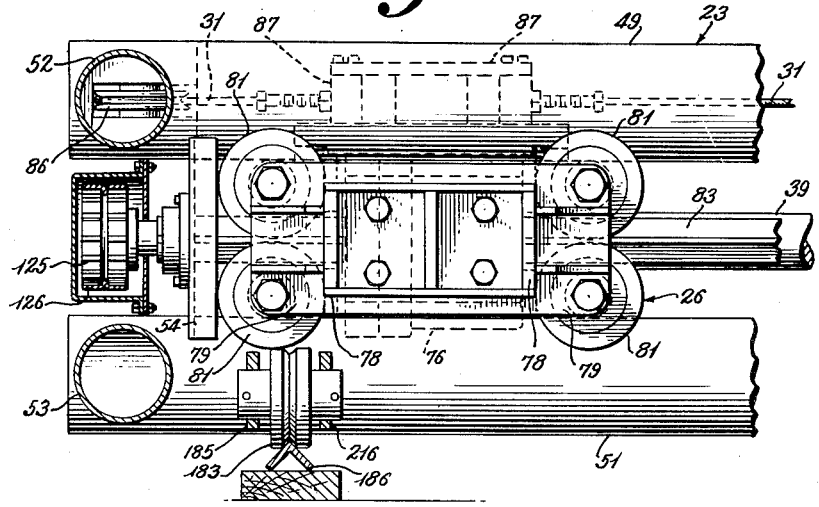
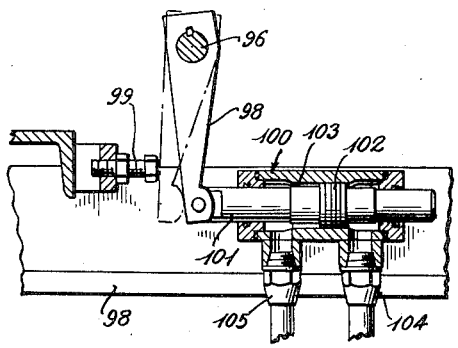
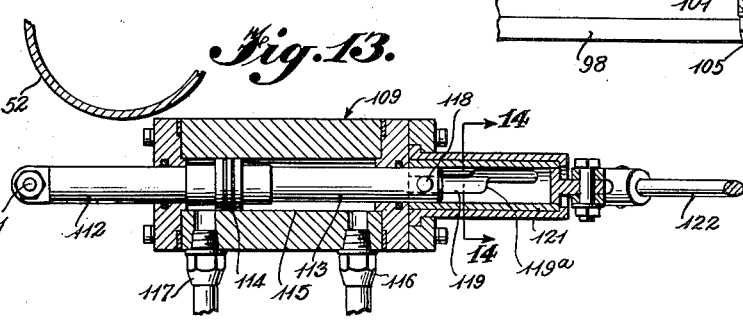
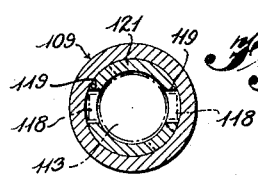
INVENTOR
Donald G. Fawkes
BY
ATTORNEY

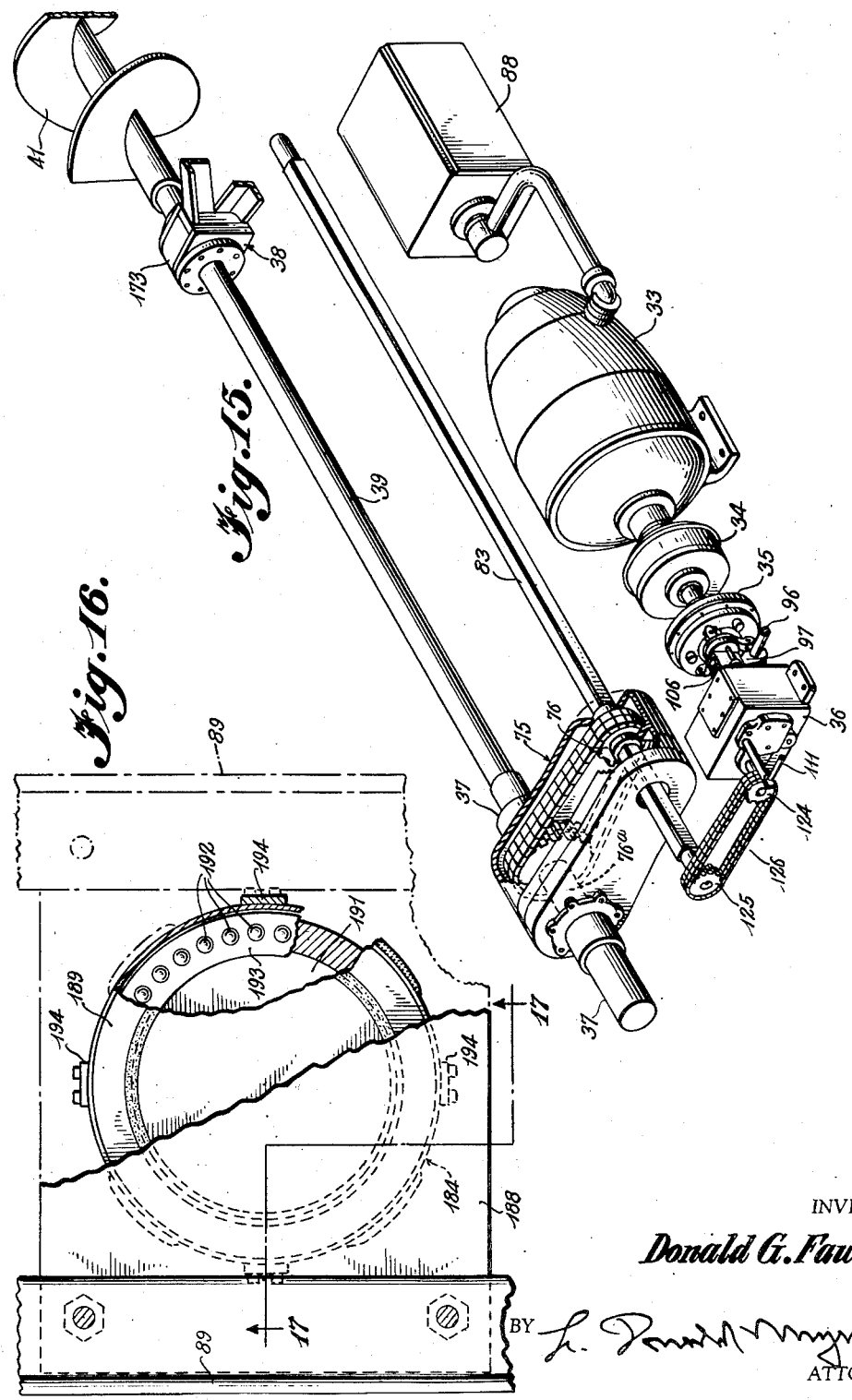

Dec. 28, 1954  D. G. FAWKES  2,698,169
UNDERGROUND COAL AUGER MACHINE
Filed April 17, 1952  9 Sheets-Sheet 8
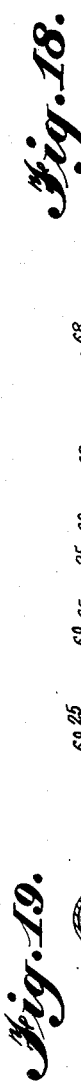
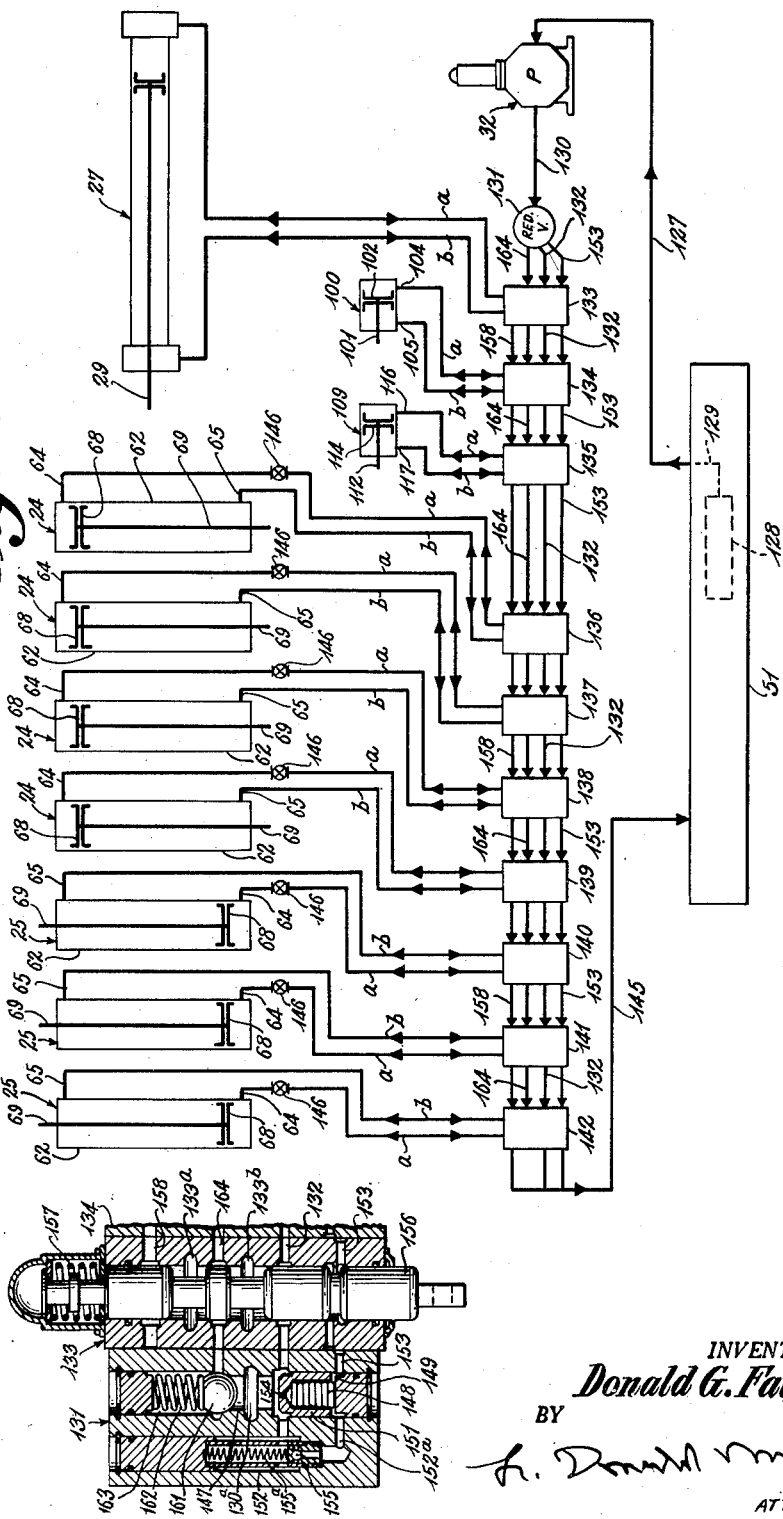
INVENTOR.
Donald G. Fawkes
BY
ATTORNEY Dec. 28, 1954   D. G. FAWKES   2,698,169
UNDERGROUND COAL AUGER MACHINE
Filed April 17, 1952   9 Sheets-Sheet 9
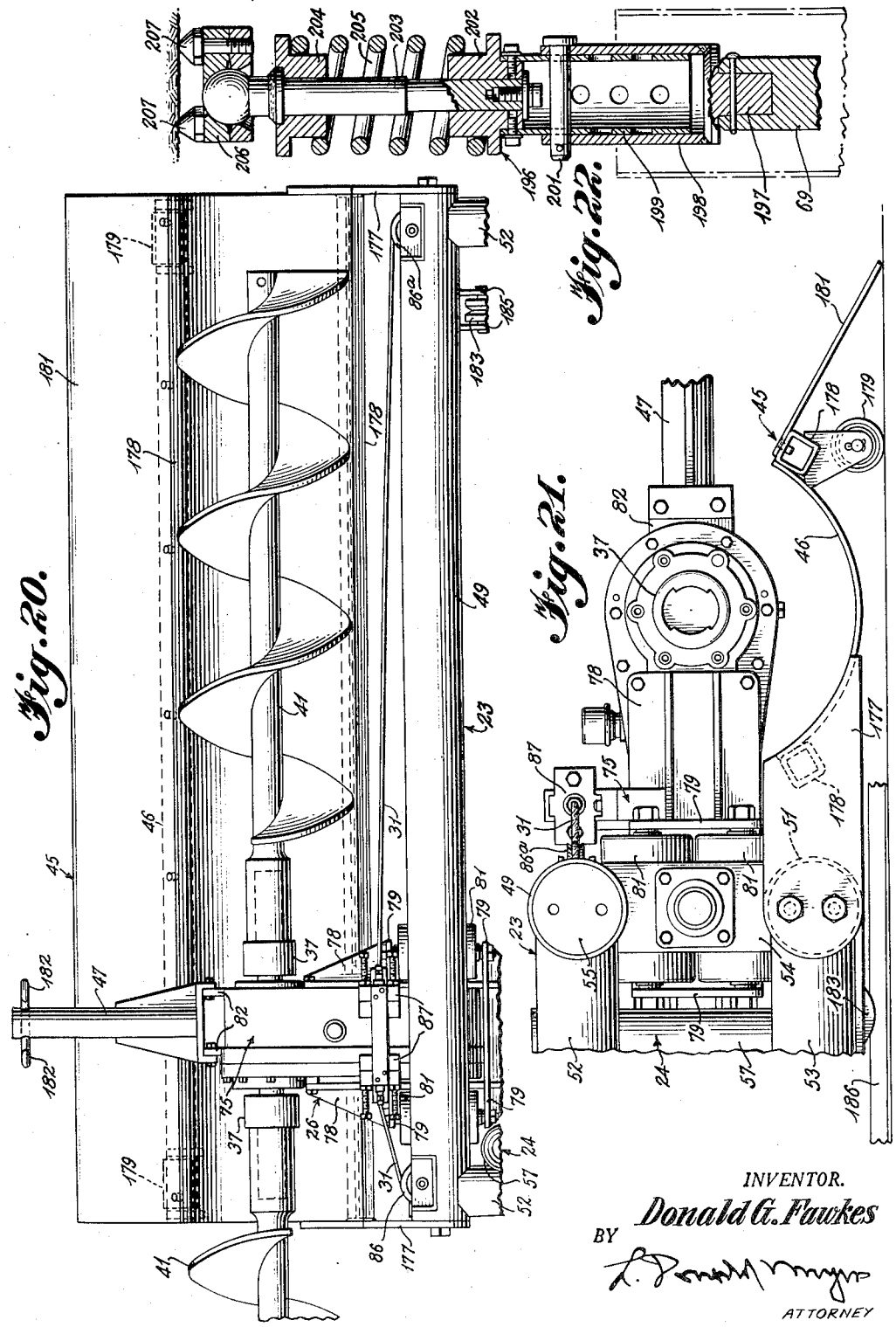
INVENTOR.
Donald G. Fawkes
BY
ATTORNEY

United States Patent Office 2,698,169
Patented Dec. 28, 1954

2,698,169

UNDERGROUND COAL AUGER MACHINE

Donald G. Fawkes, Chicago, Ill., assignor to Cardox Corporation, Chicago, Ill., a corporation of Illinois Application April 17, 1952, Serial No. 282,802

20 Claims. (Cl. 262—22)

This invention relates to new and useful improvements in mining machines for recovering coal, or the like, by drilling operations.

Because of the present day high cost of coal that is mined by methods which require the use of a substantial number of miners, considerable time and effort have been devoted in recent months to the development of machines which will continuously cut the coal from the seam and move it away from the face for loading-out purposes.

One of the machines that has been developed and is now being used extensively employs a drill train that is composed of several sections of augers with a drill head attached to the outer end. Drill trains of this type, having diameters up to 48 inches, are driven into closely adjacent locations for forming drill holes which are spaced only sufficiently to leave a relatively narrow vertical rib between adjacent holes. These holes are driven to a depth of from 70 to 100 feet. The cutter head, of course, removes the coal from the seam and the auger sections convey the cut coal back through the drill hole to the face of the seam where it can be deposited onto suitable belt conveyors, or the like, for transportation to a desired location.

The coal drilling machines of this type that have been developed so far have consisted of rather simple carriages which are designed to support the drill driving machinery and to effect the desired advancement of the drill train. For that reason, such machines only have been used to recover coal from the portions of seams in strip mines which still have too much overburden to justify further operations.

It is the primary object of this invention to provide a mining machine of the drilling type which is of such a compact and sturdy character, and which may be so readily manipulated and moved into different operative positions as to adapt it for use in recovering coal from underground mines as well as from strip mines.

A further important object of the invention is the provision of a drill type mining machine which is designed to both drive a mine entry and to drill both of the side ribs of the entry.

Still another important object of the invention is to provide a drill type mining machine which will recover coal, or the like, by driving closely adjacent, parallel drill holes either in the same or opposite faces and which will operate to withdraw the drill train from a completed hole while driving the next succeeding hole.

A further important object of the invention is to provide a mining machine which will rotate and advance a cutter head and conveying auger type of drill into either or both of two opposed ribs from a single position in a mine entry, or the like.

A further object of the invention is to provide a mining machine which will effect the drilling and removal of coal, or other minerals, from a vein located at a very slight distance above the level of the floor of the mine entry, or the like, upon which the machine rests.

A further object of the invention is to provide a drill type mining machine which will operate in a mine entry having a very low overall height and which will provide an unobstructed working space beneath and to one side of the drill hole for the efficient disposal of the coal, or other minerals, removed from the vein.

Another object of the invention is to provide a drill type mining machine which may be quickly and easily positioned and adjusted to produce a drill hole having the desired height and angle relative to the mine floor.

Still another object of the invention is to provide a drill type mining machine which may be quickly and easily positioned in a mine entry of very low overall height and adjusted to drill and remove coal, or other minerals, from a vein that is horizontally or angularly disposed, and to effect such operations on either or both of the opposed ribs of the entry.

Other objects of the invention are to provide a mining machine having a compact, sturdy main frame which is formed, for the most part, of suitable lengths of tubular stock that are employed for performing such additional functions as housing parts of the operating mechanism of the machine; which is provided with floor and roof jacks that may be manipulated so as to support the machine for drilling operations while in any desired canted, angled or slanted position; which has all of its manipulatable parts power operated by means of hydraulic motors that are controlled from one location so that the machine can be operated by one man; and which can be very readily and easily moved as a complete unit both longitudinally and laterally, raised and lowered, and rotated about a vertical axis.

Other objects and advantages of the invention will be apparent during the course of the following description.

Figure 2:
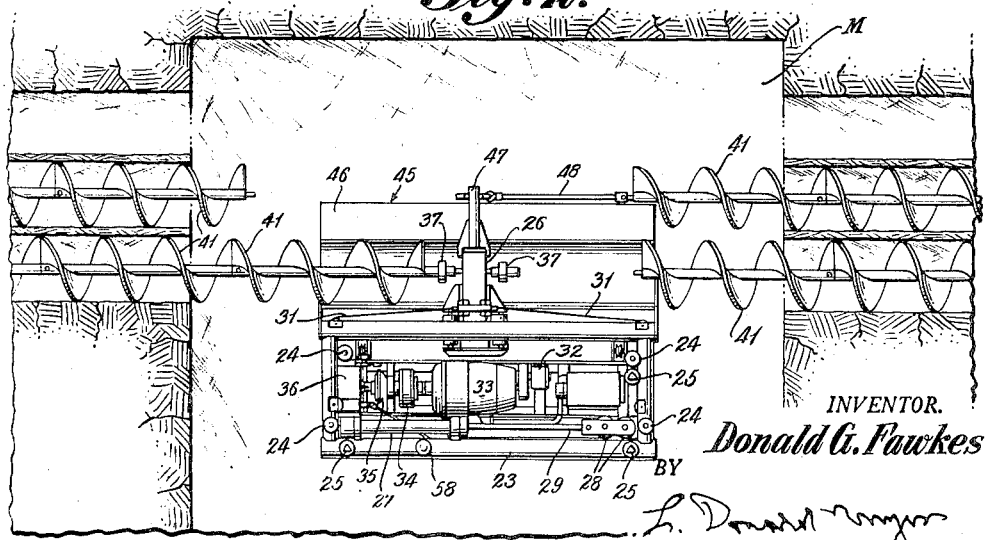
Figure 3:
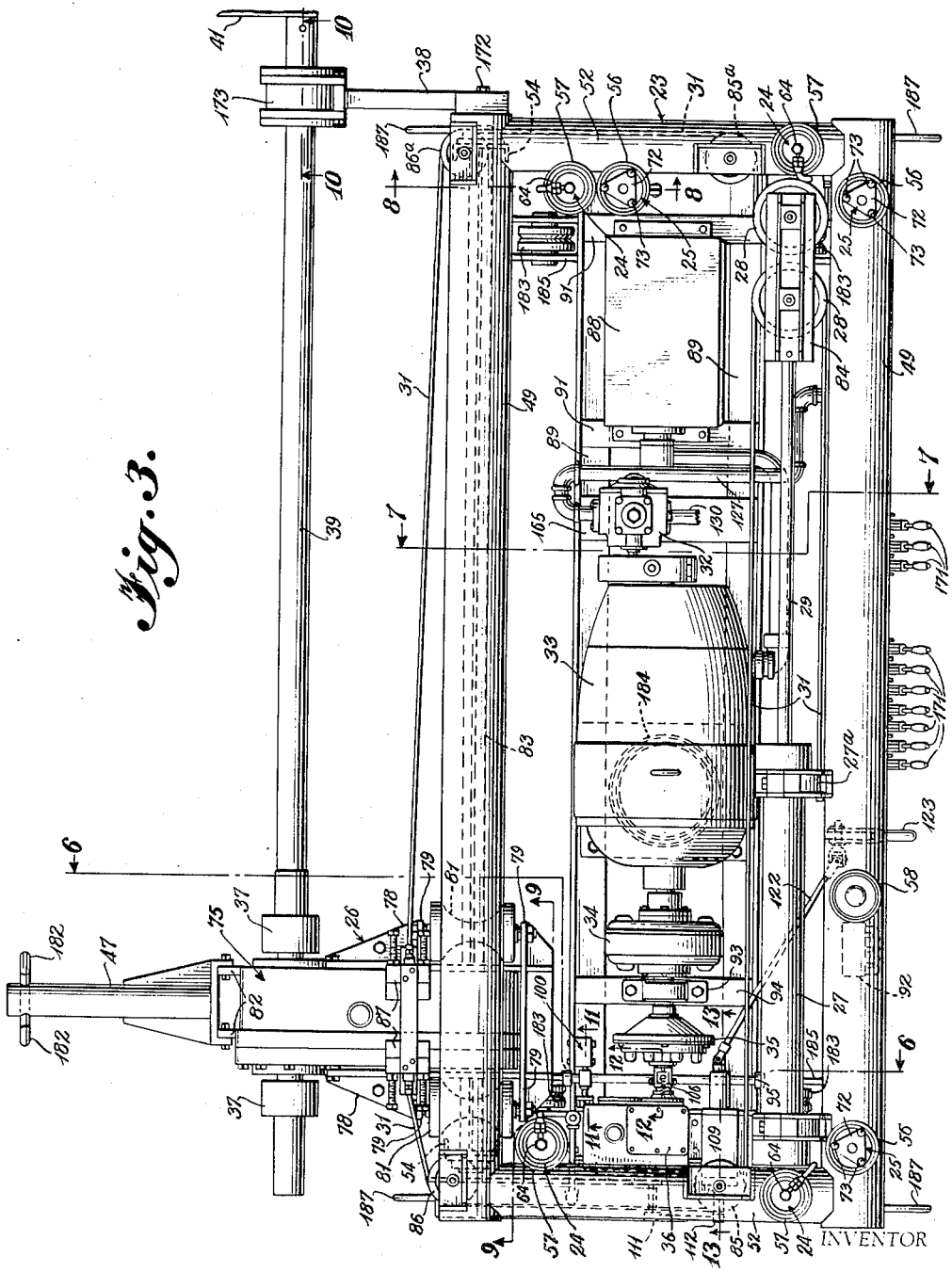

In the accompanying drawings forming a part of this specification and in which like reference characters are employed to designate like parts throughout the same, Figure 1 is a schematic view of the auger type mining machine embodying this invention and illustrates the machine equipped for driving a mine entry, Figure 2 is a schematic view of the mining machine equipped for drilling into the opposed ribs of a mine entry, Figure 3 is a top plan view of the main portion of the mining machine embodying the invention, Figure 4 is a side elevational view of the portion of the machine illustrated in Fig. 3, Figure 5 is an end elevational view of the machine, Figure 6 is a transverse sectional view taken on line 6—6 of Fig. 3, Figure 7 is a transverse sectional view taken on line 7—7 of Fig. 3, Figure 8 is a transverse sectional view taken on line 8—8 of Fig. 3, Figure 9 is a detail, longitudinal sectional view taken on line 9—9 of Fig. 3, Figure 10 is a detail, longitudinal sectional view taken on line 10—10 of Fig. 3, Figure 11 is a detail sectional view taken on line 11—11 of Fig. 3, Figure 12 is a detail sectional view taken on line 12—12 of Fig. 3, Figure 13 is a detail sectional view taken on line 13—13 of Fig. 3, Figure 14 is a detail sectional view taken on line 14—14 of Fig. 13, Figure 15 is a detail perspective view showing the arrangement of the elements which effect rotation of the drill train, Figure 16 is a fragmentary plan view, partly broken away, of the turntable which is used to support the machine for pivotal movement, Figure 17 is a fragmentary sectional view taken on line 17—17 of Fig. 16, Figure 18 is a diagrammatic view of the hydraulic system of the mining machine, Figure 19 is an enlarged sectional view of one reducing valve and the next adjacent control valve of the type employed in the hydraulic system illustrated in Fig. 18, Figure 20 is a fragmentary top plan view of the machine as modified in Fig. 2, Figure 21 is an end elevational view of the machine as illustrated in Fig. 20, and Figure 22 is a sectional view of an extension used to increase the effective length of the roof jacks when necessary.

In the drawings, wherein for the purpose of illustration are shown the preferred embodiments of the invention, and first particularly referring to Fig. 1, there is shown the mining machine arranged and equipped to drive the mine entry M. The machine includes a tubular steel main frame 23 which is supported between the floor and roof of the entry M by hydraulic floor and roof jacks 24 and 25, respectively. A carriage 26 is mounted for longitudinal movement along one side of the frame 23 and is actuated by a hydraulic motor 27 through the pulleys 28, carried by the motor piston rod 29, and the cables 31 trained over the pulleys 28 and connected to opposite sides of the carriage.

The supply of pressure fluid for operating the hydraulic motor 27 is provided by a pump 32 which is driven by the electric motor 33. At the end of the electric motor 33 opposite the pump 32, a fluid coupling 34 and clutch 35 drivingly connect the motor to the reverse gear mechanism 36 which is in turn drivingly connected to the carriage 26, as will be later described, for rotating the chucks 37 which are mounted on the carriage.

On the end of the frame 23 adjacent the working face of the entry M, a support arm 38 is removably mounted to extend laterally from the the side of the frame. Connected to the chuck 37 on the side of the carriage 26 adjacent the support arm 38 is a drill rod 39 which is supported by the arm for rotary and axial movement as the chuck is rotated and the carriage 26 is moved longitudinally of the frame 23.

Mounted on the outer end of the drill rod 39 is an auger section 41 having a drill or cutter head 42 coupled to its outer end. As the cutter head and auger section are advanced into the coal, other similar auger sections are coupled between the drill rod 39 and the last auger section to increase the length of the drill train. It will be apparent that as the drill rod 39 is rotated and advanced toward the working face of the entry M, the drill train will bore into the material which is being mined and will feed the material out of the drill hole into the mine entry for removal by any convenient means.

As illustrated in Fig. 1, the movement of the carriage 26 to advance the drill train may be utilized to withdraw the drill train that was employed to produce the adjacent completed drill hole. This withdrawal operation is accomplished by anchoring a pulley 43 by means of a post 43a located to the rear of the frame 23 and in alignment with the completed drill hole so that a cable 44 may be connected to the drill train which is to be removed, passed over the pulley 43 and connected to the side of the carriage opposite the drill rod 39. Advancement of the carriage 26 toward the working face of the entry M will, therefore, act through the cable 44 to effect withdrawal of the drill train from the previously completed drill hole.

The mining machine is illustrated in Fig. 2 as being equipped to alternately drill the opposed ribs of the mine entry M by having the support arm 38 and drill rod 39 removed and a guide pan 45 substituted therefor. This guide pan is provided with a parti-cylindrical surface 46 to support and guide the opposed auger sections 41 which are to be alternately advanced into their respective drill holes. It will be seen that the alternate movement of the carriage 26 along the side of the frame 23 will advance first one and then the other of the two drill trains which are directly connected to the chucks 37 for drilling holes into the opposite ribs of the entry M.

By way of further modification, the machine is illustrated in Fig. 2 as having mounted on the outer end of its carriage 26 an auger puller arm 47 which is adapted to be connected by a cable 48 to the drill trains remaining in the next adjacent completed drill holes. Movement of the carriage 26 in one direction, therefore, will advance a drill train 41 into one rib of the entry M and simultaneously will effect the withdrawal of the drill train 41 from the last completed drill hole in the opposite rib of the entry.

Referring now to Figs. 3 to 7, inclusive, for a detail description of the tubular steel frame 23 of the mining machine, it will be noted that this frame is formed of two vertically spaced and horizontally arranged, rectangular frame sections which are rigidly connected by a plurality of vertically arranged members. The frame 23, therefore, consists of upper and lower longitudinal members 49 and 51, respectively, at each of its sides and upper and lower transverse members 52 and 53, respectively, at each of its ends. The side of the frame 23 upon which the carriage 26 is mounted will hereinafter be referred to as the carriage side and the opposite side will be referred to as the control side.

At each corner of the frame 23 the upper and lower longitudinal members 49 and 51, respectively, are connected by vertical channel members 54 and the ends of the longitudinal members are closed by plates 55 which are welded thereto. The longitudinal members 49 and 51 on the control side of the frame 23 are also connected at their opposite end portions by cylindrical roof jack housings 56 and an additional roof jack housing 56 extends between and connects the transverse members 52 and 53 at one end of the frame. The end portions of the transverse members 52 and 53 adjacent both sides of the frame 23 are connected by cylindrical floor jack housings 57. The longitudinal members 49 and 51 on the control side of the frame 23 are connected at spaced points intermediate their ends by an oil filler line 58 and a cylindrical post 59.

The frame 23, as thus described, is of welded construction throughout and of a very low overall height to permit the machine to operate in a mine entry M having a low roof, as illustrated in Fig. 5.

By referring to Figs. 5 and 8, it will be seen that a floor jack 24 is mounted in each of the floor jack housings 57 and a roof jack 25 is mounted in each of the roof jack housings 56.

The construction of each floor jack 24 is shown in detail in Fig. 8 and consists of a cylindrical sleeve 61 having a liner 62 fitted into its bore. The sleeve 61 is rigidly mounted in the housing 57 and its upper end is closed and sealed by an end plate 63 having a hose coupling 64 threadedly connected thereto for the admission of fluid under pressure into the interior of the cylinder which is formed by the liner 62. A second hose coupling 65 is threadedly connected to the lower end portion of the sleeve 61 to admit fluid under pressure into the annular passageway 66 formed between the sleeve 61 and its liner 62 for flow into the cylinder through the radial passageways 67 formed in the liner. A piston 68 is positioned in the cylinder with its rod or plunger 69 extending from the lower end thereof. The space between the plunger 69 and the lower end portion of the cylinder is closed by suitable packing members 71.

The admission of fluid under pressure into the opposite ends of the cylinder through the hose couplings 64 and 65, therefore, will extend and retract the plunger 69 in a normal direction relative to the frame 23. The outer end portion of each plunger 69 is provided with a foot 72 mounted for universal movement and provided with calks 73 to prevent slipping of the jacks.

The construction of each of the roof jacks 25 is shown in Fig. 8 to be substantially identical with the floor jacks 24 and will not be separately described as the same reference characters have been applied to the corresponding parts of each. It will be noted that the roof jacks 25 are inverted relative to the floor jacks 24 and are slightly shorter. It will also be noted that the bottom end portion of each roof jack housing 56 is closed by a cover plate 74 which is welded in position. The operation and control of the floor and roof jacks 24 and 25, respectively, will be fully described in a later paragraph.

Referring now to Figs. 3, 5, 6 and 9, the body of the carriage 26 is formed by a chain and sprocket, or other type of gear reduction unit 75. Brackets 78 are mounted on opposite sides of the housing and each bracket is provided with a pair of spaced flanges 79 between which a pair of vertically spaced concave rollers 81 is rotatably mounted. These rollers are positioned for rolling engagement with the upper and lower longitudinal members 49 and 51 on the carriage side of the frame 23 to permit longitudinal movement of the carriage along the frame. At its outer end portion, the carriage 26 is provided with flanges 82 for removably mounting the puller arm 47.

The power input shaft 83 of the gear reduction unit 75 is shown in Figs. 5 to 9 and 15 as being substantially square in cross-section and is suitably rotatably mounted at its opposite end portions on the channel beams 54 at opposite ends of the frame 23. As is best illustrated in Figs. 6 and 15, the drive shaft 83 passes between, but out of contact with, the concave rollers 81 and through the gear reduction unit 75 where it has slidably and drivingly mounted thereon the sprocket 76 of the gear reduction unit. It will be readily apparent, therefore, that the drive shaft 83 will provide a power input to the gear reduction unit 75, regardless of the position of the latter relative to the length of the frame 23. The power output shaft 76a, of the gear reduction unit 75 has the drill driving chucks 37 suitably fastened to its opposite ends.

The carriage 26 is moved in opposite directions relative to the frame 23 by the double acting hydraulic motor 27. The plunger 29 of this motor 27, see Figs. 3 and 4, has mounted on its outer end portion a bracket 84 upon which are rotatably mounted the previously referred to pulleys 28. One of the cables 31 is anchored to the support bracket 27a at the plunger end of the hydraulic motor 27. This cable 31 is then trained over the innermost one of the two pulleys 28 and doubled back along the side of the hydraulic motor 27 to a pulley 85. The cable 31 is trained around the pulley 85 and extends through the transverse member 52 to a pulley 86 around which it is trained and then connected to a tensioning device 87 mounted on the housing of the gear reduction unit 75 for limited movement to tighten the cable.

The other cable 31 is anchored to the transverse member 52 at the opposite end of the frame from the hydraulic motor 27 and adjacent the carriage side of the frame. This cable is then trained over the outer one of the pulleys 28 and doubled back to the pulley 85a. The cable is trained around the pulley 85a and extends through the transverse member 52 to a pulley 86a around which it is trained and then connected to the tensioning device 87 mounted on the gear reduction unit 75 for limited movement to tighten the cable.

Inasmuch as movement of the pulleys 28 will simultaneously loosen one of the cables 31 as the other cable is taken up, it will be apparent that there can be no play or lost motion in the movement of the carriage. Further, since the end portions of the cables 31 which are anchored to the bracket 27a and transverse member 52 are doubled back on the pulleys 28, movement of the pulleys relative to the frame for a given distance will cause movement of the carriage 26 relative to the frame for a distance equal to twice the given distance.

Referring now to Figs. 3 to 6, inclusive, 9 and 11 to 15, inclusive, for a detail description of the drive for rotating the chucks 37, the motor 33 is mounted on angle irons 89 which are connected to and extend longitudinally of the bottom portion of the frame 23. Supporting slats 91 extend between the angle irons 89 to provide a suitable base for mounting the motor starter box 88 at one end of the frame. The supply of electrical energy to the starter box 88 is controlled by a switch box 92 on the control side of the frame 23, see Figs. 3 and 4. The output shaft of the motor 33 and its associated fluid coupling 34 and clutch 35 are supported by a bearing unit 93 mounted on the transverse brace 94.

Vertical posts 95 are mounted on the angle irons 89 for pivotally supporting a shaft 96 upon which the clutch throwout arm 97 is rigidly mounted. Figs. 6 and 11 disclose a rocker arm 98 keyed to one end portion of the shaft 96 for movement as indicated by the broken lines and limited by the adjustable stop 99. A hydraulic motor 100, see Fig. 11, is mounted on an angle iron 89 and has its plunger 101 pivotally connected to the free outer end of the rocker arm 98 and operated by a double acting piston 102 positioned in the cylinder 103 of the motor. Fluid is admitted to the opposite ends of the cylinder 103 through couplings 104 and 105, as will be later described in detail. It will be appreciated that a certain amount of lost motion is necessary in the connection between the plunger 101 and the outer end of the rocker arm 98 to permit linear movement of the plunger and its piston 102.

Upon movement of the plunger 101 and its connected rocker arm 98, the shaft 96 will rotate so that the forked outer end of the clutch throwout arm 97 will engage and effect movement of the sleeve 106 toward the clutch 35, see Fig. 12. The sleeve 106 will thereupon engage the rotating fingers 107 which function as levers to disengage the conventional plates of the clutch.

The driven shaft of the clutch 35 is connected directly to the reverse gear mechanism 36, see Figs. 3, 4, 6, 13 and 15, mounted on the supporting slat 108 extending between the spaced angle irons 89. Suitably mounted at one end of the reverse gear mechanism 36 is a hydraulic motor 109 for operating the shifting rod or lever 111 of the reverse gear mechanism. The hydraulic motor 109 is provided with an operating plunger 112 on one side and a control plunger 113 on the opposite side of the double acting piston 114, as illustrated in Fig. 13. The piston 114 is moved in opposite directions in the cylinder 115 by the admission of fluid under pressure to the opposite ends of the cylinder through the couplings 116 and 117.

The control plunger 113 is provided with radially extending pins 118 at its outer end portion for movement within the slots 119 in the sleeve 121, as illustrated in Fig. 14. The opposite end portions of the slots 119 are circumferentially offset to form radial shoulders 119a which engage the pins 118 to stop movement of the piston 114 when the reverse gear mechanism 36 has been shifted to its neutral position. Further movement of the piston 114 is made possible, however, by rotation of the sleeve 121 to align the offset portions of the slots 119 with the pins 118 in the direction of travel of the pins.

In other words, the operation of the hydraulic motor 109 to change the direction of rotation of the output shaft of the reverse gear mechanism 36 is so controlled by the sleeve 121 that the direction of rotation can never be reversed without some delay occurring in the neutral position to prevent clashing of gears. Rotation of the sleeeve 121 is effected by the rod 122 which is pivotally connected to the sleeve and is universally pivotally connected to one end of the interlock control lever 123, see Figs. 3 to 5 and 7. The output shaft of the reverse gear mechanism 36 is provided with a toothed sprocket 124 which is drivingly connected to a similar sprocket 125 on the drive shaft 83 by a drive chain 126. Rotation of the drive shaft 83 acts through the gear reduction unit 75 to rotate the chucks 37.

Referring now to Fig. 18, wherein is diagrammatically illustrated the hydraulic system of the mining machine, the pump 32 has its inlet side connected to a sump, containing a suitable operating fluid, by the connection 127. It will be noted that the sump is formed by the bore of the longitudinal frame member 51 on the control side of the frame 23 and that the feed line 127 withdraws the fluid from the sump through a filter 128 by means of a dip tube 129. The outlet side of the pump 32 is connected by the pressure line 130 to a combination pressure reducing and unloading valve 131 having its relief port connected to an unloading line 132—145 by which fluid may be returned to the sump. The pressure reducing portion of the valve 131 functions to limit the pressure of the fluid passing therethrough to a value of, for example, approximately 1,000 lbs. per square inch.

After leaving the combination valve 131, the fluid flows successively through valves 133, 134 and 135. Each of these valves is connected by two fluid lines to the opposite ends of its associated hydraulic motor 20, 100 or 109 respectively. From the valve 135, the fluid flows through a coupling block 143 and then successively through valves 136 to 142, inclusive. Each of valves 136 to 139, inclusive, is connected by two fluid lines to the opposite ends of its associated floor jack 24 while each of valves 140 to 142, inclusive, is connected by two fluid lines to the opposite ends of its associated roof jack 25. The valves 133 to 142, inclusive, are of identical construction and each provides a neutral position at which the fluid in the opposite ends of its associated hydraulic motor or jack will be maintained at a constant volume while the fluid from the pump 32 is permitted to flow freely through the valves. The reference characters a and b have been applied to the two fluid lines which extend from each control valve to its respective hydraulic motor or jack. When moved in one direction from their neutral positions, the valves 133 to 142 will admit fluid through lines a into the outer ends and will release fluid through lines b from the inner ends of their hydraulic motors or jacks. When moved in the opposite direction from their neutral positions, the valves will reverse the flow of the fluid through the lines a and b for their associated hydraulic motors or jacks. It will be apparent, therefore, that the valves 133 to 142 will effect operation of their associated hydraulic motors or jacks in either direction or will maintain the motors in a fixed position while permitting free flow of the fluid through the bank of valves. The line a connecting the outer end of each of the floor and roof jacks 24 and 25, respectively, to its associated valve is provided with a manual shut-off valve 146 which may be closed after the machine has been properly located to lock the jack in position by preventing any leakage of fluid through its valve.

Although the combination reducing and unloading valve 131 and the ten control valves 133 to 142 are diagrammatically illustrated in Fig. 18 as being spaced relative to each other, it should be understood that in the commercial embodiment of the invention the combination valve 131 and the ten control valves 133 to 142 will be assembled as a single bank. As illustrated in Fig. 4, the valve bank may include a coupling block 143 between the motor control portion of the bank and the jack control portion of the bank. This general type of multiple unit valve assembly is available on the open market and is exemplified in the James Robinson patent, No. 2,489,435, assigned to Vickers Incorporated.

Fig. 19 illustrates in full section the combination pressure reducing and unloading valve 131 and the next adjacent control valve 133 while a fragment only of the second control valve 134 is shown. As all of the control valves 133 to 142 are constructed the same, it is considered the disclosure provided by Fig. 19 will be sufficient for all of these several valves.

The pressure reducing and unloading valve 131 is illustrated in Fig. 19 as having an inlet port 130a into which the pressure fluid is delivered from the pump 32 by the line 130, Fig. 18. This inlet port opens into a vertical bore 147 in which are mounted a check valve 161, normally held against its seat by the spring 162, and an unloading valve 151, normally urged toward its seat by the spring 148.

Above the seat for the check valve 161, the bore 147 is provided with a transverse fluid delivery passage 164 which extends entirely through the bodies of all of the control valves 133 to 142 of the bank and then stops. Unseating of the check valve 161, therefore, effects the supplying of pressure fluid to all of the control valves 133 to 142.

Below the seat for the unloading valve 151, the bore 147 is provided with a transverse unloading passage 132 which extends entirely through the bodies of all the control valves 133 to 142 and then is connected to the return line 145 leading to the sump for the pump 32.

Below the unloading valve, the bore 147 is provided with a control chamber 149 which is in restricted communication with the inlet port 130a by means of the small aperture 154 formed in the unloading valve 151 so that normally the same fluid pressures exist above and below this valve. Thus the spring 148 and the difference in area between the control chamber 149 and the seat for the unloading valve hold the latter on its seat. However, if the chamber 149 were vented at a faster rate than fluid can flow through the aperture 154, the balanced pressure condition would be destroyed and the unloading valve 151 would be opened.

The control chamber 149 can be vented in either of two ways. For the purpose of limiting the maximum pressure in the inlet port 130a, a pilot relief valve 155 is mounted in a bore 152 and is urged against its seat by the spring 155a. The valve 155 is connected, as shown, between the control chamber 149 and passage 132 by means of a branch connection 152a. Also leading from the control chamber 149 is a staggered passage 153 which extends through all of the control valves and discharges into the return line 145 for the fluid supply sump of the pump 32.

The control valve 133 is illustrated as being formed with a vertical bore in which is slidably mounted a control valve spool 156. Extending through the control valves of the bank is a transverse passage 158 which is illustrated in Fig. 18 as being connected with the return line 145 and, therefore, serves as a further fluid vent. The bore of the control valve 133 is illustrated as having the two fluid ports 133a and 133b which are connected to the two fluid lines a and b, respectively, for the hydraulic motor 27 that is controlled by this valve.

The valve spool 156 controls the flow of fluid from the delivery passage 164 to either of the motor ports 133a and 133b, depending on the direction in which the spool is moved. If the spool 156 is moved to effect delivery of fluid to the port 133a, the transverse venting passage 132 will be placed in communication with the motor port 133b. Conversely, if the spool valve 156 is moved in the opposite direction, fluid will be delivered to the motor port 133b from the delivery passage 164 and the motor port 133a will be placed in communication with the transverse venting port 158. The spool valve 156 is urged into its neutral position, illustrated in Fig. 19, by the centering spring assembly 157.

Assuming now that the system is properly filled with fluid, the spools 156 for the control valves 133 to 142 are in their neutral positions and the pump 32 is operating, the pressure of the fluid in the inlet port 130a will overcome the spring 148 for the unloading valve 151 to open the latter and by-pass the fluid through the common unloading passage 132 to the return line 145. This operation of the unloading valve occurs by reason of the venting of the control chamber 149 through the passageway 153 which is open through the ten control valves.

If any one of the control valve spools 156 is moved in either direction out of its neutral position to effect the delivery of fluid to one end of its associated hydraulic motor or jack, the moved spool will close the venting passage 153. The unloading valve 151 then will be closed as a result of equalizing of the pressure on its opposite sides through the aperture 154. The pressure of the fluid in the inlet port 130a then will effect opening of the check valve 161 and the fluid will be delivered to the actuated control valve through the passage 164 and to the proper end of the associated hydraulic motor. As was explained above, when the control spool 156 of one of the valves is moved to effect delivery of pressure fluid to one end of its associated motor or jack, the other end of the same motor will be placed in communication with the proper one of the transverse venting passages 132 and 158 so that the piston of the motor will move as desired.

After the selected motor or jack has been operated to the desired extent, the actuated control spool 156 should be returned to its neutral position and the motor then will be held in its actuated condition. The unloading valve 151 will again be opened and the fluid from the pump 32 will be by-passed through the passage 132 and the return line 145 to the sump.

Assuming that the unloading valve 151 is closed as a result of the delivery of fluid to one of the hydraulic motors, if the pressure in the inlet port 130a exceeds the desired maximum value for the valve bank, the pilot relief valve 155 will be opened against the pressure of its spring by the excessive fluid pressure that is built up in the control chamber 149 through the action of the aperture 154. The pressure in the control chamber then will be reduced sufficiently to permit the unloading valve 151 to open and vent the excessive pressure through the unloading passage 132.

As illustrated in Figs. 3 and 7, the pump 32 is mounted on a supporting frame member 165 extending between the angle irons 96 adjacent one end of the motor 33. The shafts of the pump 32 and the motor are connected by sprockets 166 and 167 and a drive chain 168.

Fig. 4 illustrates the arrangement of the bank of valves 133 to 142, inclusive, on the longitudinal member 51 at the control side of the frame 23. Each of these valves is provided with an operating handle 171 for movement of its valve spool 156. The connections between ports 133a and 133b of the valves and the opposite ends of their associated hydraulic motors 27, 100 and 109 and floor and roof jacks 24 and 25, respectively, may be made of any suitable hose or pipe and arranged in a manner which is most convenient for the particular device to be connected.

In the arrangement of the mining machine illustrated in Fig. 1, the support arm 38 is mounted on one end of the frame 23 to support the drill rod 39 in axial alignment with the chuck 37 on the adjacent side of the carriage 26. As illustrated in Fig. 8, the support arm 38 is mounted on the frame 23 by bolts 172 which pass through the arm and through holes in the end plates 55 of the longitudinal frame members 49 and 51 on the carriage side of the frame. Similar holes are provided in the plates 55 at the opposite end of the frame 23 so that the support arm 38 may be quickly and easily mounted on either end of the frame.

As illustrated in Fig. 10, the outer end of the support arm 38 is provided with a bearing housing 173 for mounting anti-friction bearings 174 which support the drill rod 39 for rotary movement. The inner races of the bearings 174 are mounted on a sleeve 175 having a plain bearing 176 mounted in its bore for slidingly engaging the drill rod 39 to permit axial movement of the rod through the housing 173. The drill rod 39, therefore, is supported at spaced points along its length by the support arm 38 and the chuck 37 to maintain proper alignment of the rod during movement of the carriage 26 along the side of the frame 23.

In the arrangement of the mining machine illustrated in Figs. 2, 20 and 21, the support arm 38 and drill rod 39 have been removed and the guide pan 45 substituted therefor. The support plate 46 of the guide pan 45 is arcuate in cross-section and is concentric with the axis of the chucks 37, the radius of curvature of the support plate being equal to the radius of the auger sections 41 to be supported thereby. The guide pan 45 is connected to the frame 23 by a pair of bracket arms 177 which are bolted to the end plates 55 of the longitudinal member 51 on the carriage side of the frame 23. A pair of stiffening braces 178 extends along each of the side edges of the support plate 46 so that the latter will maintain proper alignment of the auger sections as they are advanced along the plate by the carriage 26.

Rotatably mounted beneath the pan 45 is a pair of rollers 179 for supporting the pan on the floor of the mine entry M, or the like. A ramp 181, forming a part of the pan, is connected to and inclined downwardly from the outer side of the support plate 46 so that the auger sections 41 to be connected to the chucks 37 may be rolled into position on the plate 46.

This arrangement of the mining machine includes a puller arm 47, also illustrated in Figs. 3, 5 and 6, which is removably mounted on the flanges 82 at the outer end of the carriage 26 and extends outwardly therefrom in the plane of the axis of the chucks 37. At its outer end portion, the puller arm 47 has mounted thereon a pair of oppositely disposed hooks 182 to which may be connected the cable 48 employed for withdrawing the auger sections 41, as illustrated in Fig. 2.

The rapid and easy movement from one operating location to another and the proper positioning of the mining machine at a given location are made possible by the wheels 183 and by the turntable 184, see Figs. 4, 6, 7, 9, 16 and 17. The wheels 183 are rotatably mounted between transverse members 185 which are connected at their opposite ends to the longitudinal members 51 and the angle irons 96. The diameter of the wheels 182 is such that their peripheries are located below the plane of the bottom of the turntable 184. When it becomes necessary, or desirable, to move the mining machine to a new location, it is raised by the floor jacks 24 so that rails 186, formed of angle irons, or the like, may be positioned beneath the wheels 183. The machine is then lowered onto the rails 186 and moved therealong by tow cables, or any other convenient means. As illustrated in Figs. 3, 4, and 5, the frame 23 is provided with towing eyes 187 which are mounted on the longitudinal member 49 at the control side of the frame and on the longitudinal member 51 at the carriage side of the frame. These towing eyes 187 also may be used to provide additional bracing when the machine is being operated, as illustrated in Fig. 5.

The turntable 184 is mounted for rotation about a vertical axis on a plate 188 extending between the angle irons 89 located beneath the motor 33. This positioning of the turntable 184 is approximately beneath the center of gravity of the mining machine so that it may be supported on the turntable without tilting or tipping. As illustrated in Figs. 16 and 17, the turntable 184 is formed of a top plate 189 and a bottom plate 191 having opposed circular raceways attached thereto for receiving balls 192 which are maintained in their circumferentially spaced relationship by a spacer plate 193. The bottom plate 191 is maintained in its proper vertically spaced relationship with the top plate 189 by flanged brackets 194. Whenever it becomes necessary to rotate the mining machine into a different drilling position, it is elevated by the floor jacks 24 and a block 195 is positioned beneath the turntable as illustrated in Fig. 7. The machine is then lowered until the turntable bears on the block 195, at which time the machine may be rotated until it is properly positioned.

Figs. 5 and 8 illustrate the manner in which the floor jacks 24 and roof jacks 25 cooperate to maintain the mining machine in a fixed operating position between the floor and roof of a mine entry M having a relatively low overall height. Occasionally, however, it may be necessary for the machine to be fixed in an operating position in a mine entry having an overall height which is greater than the vertical distance between the feet 72 of the fully extended floor and roof jacks. When such a condition is encountered, the effective length of the roof jacks 25 may be substantially increased by the use of the extension 196 illustrated in Fig. 22. This extension is provided with a lug 197 at its lower end portion which is received in the depression formed in the upper end of the plunger 69 to mount the extension on the jack 25. Concentric sleeves 198 and 199 at the lower portion of the extension 196 may be moved axially relative to each other to adjust the overall length of the extension and then fixed by a pin 201 passing through alined openings in the sleeves. At its upper end portion, the sleeve 199 is provided with a collar 202 having a telescopic plunger 203 attached thereto and extending upwardly therefrom. At its upper end portion, the plunger 203 is provided with a collar 204 and a spring 205 is positioned between the collars 202 and 204 to extend the plunger 203. Immediately above the collar 204, a foot 206 is universally connected to the end of the plunger 203 and is provided with calks 207 for engaging the roof in the mine entry M.

The operation of the machine illustrated in Fig. 1 will be described as follows:

The machine is moved into the mine entry M on the rails 186 as illustrated in Figs. 4, 6 and 9. At this time, the floor and roof jacks 24 and 25, respectively, are in their fully retracted positions. When the machine has reached the desired operating position in the entry M, the valves 136 to 139, inclusive, are operated to extend the floor jacks 24 and elevate the machine. The rails 186 are then removed and the machine is lowered by means of the valves 136 to 139, inclusive, so that its turntable 184 rests upon a block 195. The machine may then be arranged in parallelism with the end face of the entry by rotating it through a one-quarter turn, after which it is again elevated so that the block 195 may be removed and rails 186 replaced below the wheels 183. The machine is then lowered and may be moved to the side of the entry M. The floor and roof jacks then are extended to anchor the machine and, if necessary, to raise the same to the desired elevation, so that the auger section 41 and drill head 42 are properly positioned for drilling the first hole.

The drilling of the first and each subsequent hole in the end face of the entry M is carried out by the following procedure:

The starting box 88 of the motor 33 being connected to a suitable source of electrical current and the motor set into operation by actuating the starting switch 92, valve 134 is operated to disengage the clutch 35. The carriage 26 is then moved to its position furthest away from the face of the entry to be drilled by operation of the valve 133 to admit fluid to the inner end of the hydraulic motor 27. The drill head 42 and an auger section 41 are connected to the drill rod 39 and the carriage 26 is advanced by the hydraulic motor 27 toward the wall to be drilled. During advancement of the carriage 26, the hydraulic motor 100 is actuated by its valve 134 to cause the clutch 35 to be engaged. As soon as the clutch 35 is engaged, and also when the clutch is disengaged, the control valve 134 can be returned to its neutral position and the motor 100 will maintain the clutch in its desired position. The drill rod 39 will thereupon be rotated by the mechanical drive train in the proper direction, as determined by the setting of the reverse gear mechanism 36, to cause the drill head 42 to cut into the wall. The hydraulic motor 27 will continue the advancement of the carriage 26 until it has advanced to the end of the frame 23 which is closest to the wall of the entry M. The clutch 35 is thereupon disengaged and the drill rod 39 disconnected from the end of the auger section 41. The carriage 26 is then moved to the opposite end of the frame 23 so that another auger section 41 may be coupled between the ends of the drill rod 39 and the first auger section. Rotation and advancement of the drill rod 39 is then continued in the manner previously described and this operation repeated until the hole has been drilled to its proper depth.

Upon completion of each hole, the machine is moved laterally across the mine entry M for a distance slightly greater than the diameter of the auger section 41 for the drilling of the next adjacent hole. The operation of drilling each of the succeeding holes is the same with the single exception that the previously used drill train is withdrawn from the drill hole it produced during the drilling of the adjacent new hole. This removal of the drill train may be carried out as illustrated in Fig. 1 by the use of a pulley 43 and cable 44 so that each forward movement of the carriage 26 will cause one of the auger sections 41 to be withdrawn from the completed hole. Alternatively, the puller arm 47 may be connected to the carriage 26, as illustrated in Fig. 3, and the auger sections 41 in the completed drill hole be removed by connecting the puller arm directly to the drill train and withdrawing the latter as the carriage 26 is moved away from the face of the mine entry M.

It will be appreciated that during each of the above described drilling operations, the machine is maintained in a rigidly fixed position by the floor and roof jacks 24 and 25, respectively, which are extended into tight engagement with the floor and roof, respectively, of the mine entry M. Inasmuch as each of the floor and roof jacks 24 and 25 is individually adjustable by means of its respective valve, 136 to 142, inclusive, irregularities in either the floor or the roof of the entry M may be compensated for by individual adjustment of the appropriate floor or roof jack.

The machine may be tilted or canted by individual adjustments of the floor and roof jacks 24 and 25 on opposite sides or ends of the frame 23. This tilting or canting of the machine permits the drilling of holes which are inclined relative to the floor of the mine entry M. By reference to Fig. 5, it will be seen that the floor and roof jacks 24 and 25 may be used to raise or lower the carriage side of the frame 23 while the control side is being lowered or raised, respectively, so that the hole may be drilled into the wall of the mine entry at a point close to either the roof or the floor of the entry, as desired.

Referring once again to Fig. 1, it will be appreciated that the machine will be unable to drill a series of holes completely across the end of the mine entry M while in the position illustrated. This difficulty, however, is overcome by lowering the machine onto its turntable 184 and rotating it through 180° to effect an end-for-end reversal. The supporting arm 38 will then be removed from the end of the frame 23 at which it is illustrated and remounted on the opposite end. The drill rod 39 is also transferred for connection with the chuck 37 on the opposite side of the carriage 26. The machine may thereupon be traversed for the remainder of the distance across the end face of the mine entry M.

The arrangement illustrated in Fig. 2 is particularly adapted for drilling into the opposed ribs of a mine entry M from a single position of the machine. In this type of operation, the auger sections 41 are coupled directly to the chucks 37 and the guide pan 45 supports the auger sections in axial alignment with the chucks. Each movement of the carriage 26 along the frame 23, therefore, will advance an auger section 41 into one or the other of the two opposed ribs of the entry M. The auger puller arm 47 may also be used in this operation to withdraw the drill trains from the completed drill holes.

Although the mining machine has been disclosed and described in connection with its use in a mine entry M, it is to be understood that the use of the invention is not limited to this particular type of mining operation since the machine, also, may be used equally successfully for drilling into the exposed face of an overburdened seam of coal.

It is to be understood that the forms of this invention herein shown and described are to be taken as the preferred examples of the same, and that various changes in the shape, size, and arrangement of parts may be resorted to without departing from the spirit of the invention or the scope of the subjoined claims.

Having thus described the invention, I claim:

1. A mining machine, comprising a frame, means for supporting said frame in different fixed positions, a laterally extending carriage mounted on one side of said frame for longitudinal movement along said frame, chuck means mounted on the outer portion of said carriage for rotation about an axis in spaced parallel relationship with said one side of the frame, means extending through said carriage for rotating said chuck means in opposite directions, and means for moving said carriage in opposite direction along said frame independently of the rotation of said chuck means.

2. A mining machine, comprising a frame, extensible supporting means mounted on spaced portions of said frame for raising and lowering the frame for maintaining the latter in different fixed operating positions, pressure fluid operated means for adjusting said extensible supporting means to vary the position of said frame, a laterally extending carriage mounted on one side of said frame for longitudinal movement along said frame, chuck means mounted on the outer portion of said carriage for rotation about an axis in spaced parallel relationship with said one side of the frame, means extending through said carriage for rotating said chuck means in opposite directions, and means for moving said carriage in opposite directions along said frame independently of the rotation of said chuck means.

3. A mining machine, comprising a frame, supporting means mounted on said frame for raising and lowering the latter into and maintaining it in different horizontal and angularly canted operating positions in a mine entry, a laterally extending carriage mounted on one side of said frame for longitudinal movement along said frame, chuck means rotatably mounted on the outer portion of said carriage and adapted to be connected to a drilling implement, canting of said frame to lower said one side thereof permitting movement of the drilling implement to the floor level of the mine entry, means extending through said carriage for rotating said chuck means in opposite directions, and means for moving said carriage in opposite directions along said frame independently of the rotation of said chuck means.

4. A mining machine, comprising a frame, independently operable means mounted on spaced portions of said frame for raising and lowering the latter into and maintaining it in different horizontal and angularly canted operating positions, a plurality of wheels for supporting said frame for lateral movement when the frame is sufficiently lowered by said independently operable means, a turntable mounted on said frame to support the latter for rotary movement about a vertical axis when the frame is lowered to a position at which the turntable rests on a suitably elevated base, a laterally extending carriage mounted on one side of said frame for longitudinal movement along said frame, chuck means mounted on the outer portion of said carriage for rotation about an axis in spaced parallel relationship with said one side of the frame, means extending through said carriage for rotating said chuck means in opposite directions, and means for moving said carriage in opposite directions along said frame independently of the rotation of said chuck means.

5. A mining machine, comprising a frame, means for supporting said frame in different fixed positions, a laterally extending carriage mounted on one side of said frame for longitudinal movement along said frame, a pair of chucks mounted on opposite sides at the outer end portion of said carriage for rotation about a common axis in spaced parallel relationship with said one side of the frame, means extending through said carriage for rotating said chucks, means for reversing the direction of rotation of said chucks, and means for moving said carriage in opposite directions along said frame independently of the rotation of said chucks.

6. A mining machine, comprising a frame, means for supporting said frame in different fixed positions in a mine entry, a laterally extending carriage mounted on one side of said frame for longitudinal movement along said frame, a pair of chucks rotatably mounted on opposite sides at the outer end portion of said carriage and adapted to be connected to a drilling implement, said chucks being movable with said frame by adjustment of said supporting means to lower said drilling implement to the floor level of the mine entry, a prime mover mounted on said frame, means extending through said carriage for drivingly connecting said prime mover and said chucks for rotating the latter in all positions of the carriage relative to the frame, means associated with such connecting means for reversing the direction of rotation of the chucks, and cable means supported by said frame and connected to said carriage for moving the latter in opposite directions along said frame independently of the rotation of said chucks.

7. A mining machine, comprising a frame, means for supporting said frame in different fixed positions, a laterally extending carriage mounted on one side of said frame for longitudinal movement along said frame, a pair of chucks mounted on opposite sides at the outer end portion of said carriage for rotation about a common axis in spaced parallel relationship with said one side of the frame, a prime mover mounted on said frame, a drive shaft rotatably mounted on the frame and extending through said carriage, means for driving said shaft from the prime mover, means mounted in the carriage and slidably mounted on said shaft in non-rotatable relationship with the latter for driving the chucks from the shaft, means for reversing the direction of rotation of the chucks, a pair of cables connected to and extending in opposite directions from said carriage along said one side of said frame, and means for selectively playing out one of said cables while the other is taken up to move said carriage in opposite directions along said frame independently of the rotation of said chucks.

8. A mining machine, comprising a frame, means for supporting said frame in different fixed positions, a laterally extending carriage mounted on one side of said frame for longitudinal movement along said frame, a pair of chucks mounted on opposite sides at the outer end portion of said carriage for rotation about a common axis in spaced parallel relationship with said one side of the frame, a prime mover mounted on said frame, a drive shaft rotatably mounted on the frame and extending through said carriage, means for driving the shaft from said prime mover, means mounted in said carriage and slidably mounted on the shaft in non-rotatable relationship with the latter for driving the chucks from the shaft, means for reversing the direction of rotation of the chucks, a double acting hydraulic motor mounted on said frame, and cables operatively connecting said motor to said carriage for moving the latter in opposite directions along said frame independently of the rotation of said chucks.

9. A mining machine, comprising a frame, means mounted on said frame for raising and lowering the latter into different horizontal and angularly canted operating positions, a laterally extending carriage mounted on one side of said frame for longitudinal movement along said frame, chuck means mounted on the outer portion of said carriage for rotation about an axis along said one side of the frame in spaced parallel relationship with said one side of the frame, a prime mover mounted on said frame, means extending along said one side of the frame and through said carriage for drivingly connecting said prime mover and said chuck means for rotating the latter in all positions of the carriage relative to the frame, means for reversing the direction of rotation of the chuck means, and means for moving said carriage in opposite directions along said frame independently of the rotation of said chuck means.

10. A mining machine, comprising a frame formed of a plurality of connected hollow members, means housed within certain of said frame members and extensible therefrom for raising and lowering the frame into different horizontal and angularly canted operating positions, a laterally extending carriage mounted on one side of said frame for longitudinal movement along said frame, chuck means mounted on the outer portion of said carriage for rotation about an axis along said one side of the frame in spaced parallel relationship with said one side of the frame, means extending along one side of the frame and through said carriage for rotating said chuck means in opposite directions, a double acting hydraulic motor mounted on said frame, a pair of cables connected to said carriage adjacent said frame and to said hydraulic motor for moving the carriage in opposite directions along said frame independently of the rotation of said chuck means.

11. A mining machine, comprising a frame, means for supporting said frame in different fixed positions, a laterally extending carriage mounted on one side of said frame for longitudinal movement along said frame, chuck means mounted on the outer portion of said carriage for rotation about an axis in spaced parallel relationship with said one side of the frame, a guide arm mounted to extend laterally outwardly from the end of said one side of the frame, a drill rod having one end connected to said chuck means and the other end portion adapted to be connected to a drilling implement, said drill rod being supported by the guide arm laterally outwardly of said one side of the frame for axial and rotary movement by the chuck means and for vertical adjustment by said supporting means for the frame, means extending through said carriage for rotating said chuck means and the connected drill rod in opposite directions, and means for moving said carriage and its chuck means in opposite directions along said frame to advance and retract the drill rod independently of the rotation of said chuck means.

12. A mining machine, comprising a frame, means for supporting said frame in different fixed positions, a laterally extending carriage mounted for longitudinal movement along one side of said frame, drilling implement driving means mounted on the outer portion of said carriage for rotation about an axis in spaced parallel relationship with said one side of the frame, a guide pan connected to and extending laterally from said one side of the frame below the path of movement of said carriage, said pan having a guide surface arcuately formed in cross-section and coaxial with said implement driving means for rotatably supporting the drilling implement in axial alignment with said implement driving means, means for rotating said implement driving means in opposite directions, and means for moving said carriage in opposite directions along said frame independently of the rotation of said implement driving means.

13. A mining machine, comprising a frame, means for supporting said frame in different fixed positions, a laterally extending carriage mounted for longitudinal movement along one side of said frame, rotatable means mounted on the outer portion of said carriage and adapted to be connected to a first drilling implement for rotating the latter about an axis located in parallel relationship with said one side of the frame, means for rotating said rotatable means in opposite directions, a puller arm mounted on and extending laterally outwardly from said carriage, means attached to said puller arm and adapted to be connected to a second drilling implement, and means for moving said carriage in opposite directions along said frame independently of the rotation of said rotatable means to advance the first drilling implement connected to the rotatable means into its drill hole and to withdraw the second drilling implement connected to the means attached to said puller arm from its drill hole.

14. A mining machine, comprising a frame, means for supporting said frame in different fixed positions, a laterally extending carriage mounted for longitudinal movement along one side of said frame, a pair of chucks rotatably mounted on opposite sides at the outer end portion of said carriage and adapted to be connected to drilling implements that are positioned in laterally outwardly spaced parallel relationship with said one side of the frame, a prime mover mounted on said frame, means extending through said carriage and drivingly connected to said prime mover and said chucks for rotating the latter, pressure fluid operated means for interrupting the connection between said drive shaft and prime mover to stop rotation of said chucks, pressure fluid operated means associated with said drive shaft and said prime mover for controlling the direction of rotation of said chucks, pressure fluid operated means for moving said carriage in opposite directions along said frame independently of the rotation of said chucks, and means driven by said prime mover for supplying pressure fluid to operate each of said pressure fluid operated means.

15. A mining machine, comprising a frame, means for supporting said frame in different fixed positions, a laterally extending carriage mounted for longitudinal movement along one side of said frame, a pair of chucks rotatably mounted on opposite sides at the outer end portion of said carriage and adapted to be connected to drilling implements that are positioned in laterally outwardly spaced parallel relationship with said one side of the frame, a drive shaft rotatably mounted on the side of said frame and extending through said carriage, drive means mounted in non-rotatable relationship with and for longitudinal movement along said drive shaft and positioned in said carriage to effect rotation of said chucks as the carriage is moved along said frame, a prime mover mounted on said frame, drive means connecting said prime mover and said drive shaft, said drive means including a fluid coupling, a clutch and a reverse gear mechanism, a hydraulic motor for operating said clutch, a hydraulic motor for operating said reverse gear mechanism, a hydraulic motor operatively connected to said carriage for moving the latter in opposite directions along said frame, and means driven by said prime mover for supplying the pressure fluid to operate each of said hydraulic motors.

16. A mining machine, comprising a frame, means for supporting said frame in different fixed positions in a mine entry, a laterally extending carriage mounted for longitudinal movement along one side of said frame, a pair of chucks rotatably mounted on opposite sides at the outer end portion of said carriage and adapted to be connected to drilling implements that are positioned in laterally outwardly spaced parallel relationship with said one side of the frame, said supporting means being adjustable to lower said one side of the frame to a level at which the drilling implement is at the floor level of the mine entry, a drive shaft rotatably mounted on the side of the frame and extending through said carriage, drive means mounted in non-rotatable relationship with and for longitudinal movement along said drive shaft and positioned in said carriage to effect rotation of said chucks as the carriage is moved along said frame, a prime mover mounted on said frame, drive means connecting said prime mover and said drive shaft, said drive means including a fluid coupling, a clutch and a reverse gear mechanism, a hydraulic motor for operating said clutch, a hydraulic motor for operating said reverse gear mechanism, a hydraulic motor operatively connected to said carriage for moving the latter in opposite directions along said frame, a pump driven by said prime mover to provide a source of pressure fluid, and separate valve controlled fluid connections between each of said hydraulic motors and said source of fluid pressure to selectively reverse the directions of movement of the motors and maintain the motors in fixed stationary positions.

17. A mining machine, comprising a frame, pressure fluid operated supporting means mounted on spaced portions of said frame for raising and lowering the latter into different horizontal and angularly canted operating positions in a mine entry, a laterally extending carriage mounted for longitudinal movement along one side of said frame, a pair of chucks rotatably mounted on opposite sides at the outer end portion of said carriage and adapted to be connected to drilling implements, said chucks being movable with said frame by adjustment of said supporting means to lower said drilling implements to the floor level of the mine entry, a drive shaft rotatably mounted on the side of said frame and extending through said carriage, drive means mounted in non-rotatable relationship with and for longitudinal movement along said drive shaft and positioned in said carriage to effect rotation of said chucks as the carriage moves along said frame, a prime mover mounted on said frame, drive means connecting said prime mover and said drive shaft, said drive means including a fluid coupling, a clutch and a reverse gear mechanism, a hydraulic motor for operating said clutch, a hydraulic motor for operating said reverse gear mechanism, a hydraulic motor operatively connected to said carriage for moving the latter in opposite directions along said frame, a pump driven by said prime mover to provide a source of pressure fluid, and separate valve controlled fluid connections between said pressure fluid operated means and motors and said source of pressure fluid to selectively actuate the pressure fluid operated means at different spaced portions of said frame, to reverse the directions of movement of the motors and to maintain the pressure fluid operated means and motors in fixed stationary positions.

18. A mining machine for operating in a mine entry having a relatively low overall height, comprising a frame, a plurality of independently operable hydraulic jacks mounted in vertical positions on and adjacent opposite sides of said frame to engage the mine floor for raising and lowering the frame into different horizontal and angularly canted positions, independently operable means mounted on spaced portions of said frame for engaging the mine roof to rigidly anchor said frame in its different operating positions, means for selectively increasing and decreasing the effective lengths of the roof engaging means, a laterally extending carriage mounted for longitudinal movement along one side of said frame, chuck means rotatably mounted on the outer portion of said carriage and adapted to be connected to a drilling implement in spaced parallel relationship with said one side of the frame, operation of said jacks to lower said one side and to raise the opposite side of said frame causing said drilling implement to be lowered to the level of the mine floor, a prime mover mounted on said frame, means extending through said carriage for drivingly connecting said prime mover and said chuck means for rotating the latter in all positions of the carriage relative to the frame, means for reversing the direction of rotation of the chuck means, and means for moving said carriage in opposite directions along said frame independently of the rotation of said chuck means.

19. A mining machine, comprising an elongated frame formed of horizontally and vertically arranged hollow members with the vertical members extending between and connecting the horizontal members in vertically spaced relationship, a plurality of independently operable hydraulic jacks each mounted in a different one of said vertical members for raising and lowering the frame into different horizontal and angularly canted operating positions in a mine entry, a carriage extending laterally outwardly from one side of said frame and having rollers positioned between and engaging the vertically spaced horizontal members at said one side of the frame to permit longitudinal movement only of the carriage along the frame, chuck means rotatably mounted on the outer portion of said carriage and adapted to be connected to a drilling implement in spaced parallel relationship with said one side of the frame, selective operation of said jacks causing said drilling implement to be raised, lowered, and angularly canted in the mine entry, means for rotating said chuck means in opposite directions, and means for moving the carriage in opposite directions along said frame independently of the rotation of said chuck means.

20. A mining machine, comprising an elongated frame formed of horizontally and vertically arranged hollow members with the vertical members extending between and connecting the horizontal members in vertically spaced relationship, a plurality of hydraulic jacks each mounted in a different one of said vertical members for raising and lowering the frame into different horizontal and angularly canted operating positions in a mine entry, a carriage extending laterally outwardly from one side of said frame and having rollers positioned between and engaging the vertically spaced horizontal members at said one side of the frame to permit longitudinal movement only of the carriage along the frame, a pair of chucks rotatably mounted on opposite sides at the outer end portion of said carriage and adapted to be connected to drilling implements in spaced parallel relationship with said one side of the frame, operation of said jacks to lower said one side of the frame effecting movement of the drilling implement to the level of the mine entry, a prime mover mounted on said frame, means extending through said carriage for drivingly connecting said prime mover and said chucks for rotating the latter, a hydraulic motor for controlling the direction of rotation of said chucks, a hydraulic motor for moving said carriage in opposite directions along said frame independently of the rotation of said chucks, means forming a fluid supply sump in one of the hollow members of said frame, a pump driven by said prime mover for withdrawing fluid from said sump and supplying the same under pressure to said hydraulic jacks and said hydraulic motors, and separate valve controlled fluid lines for selectively controlling the aforesaid supply of pressure fluid.

References Cited in the file of this patent

UNITED STATES PATENTS

| Number | Name | Date |
|---|---|---|
| 112,626 | Perrin et al. | Mar. 14, 1871 |
| 1,001,903 | Temple | Aug. 29, 1911 |
| 1,776,099 | Black | Sept. 16, 1930 |
| 1,812,719 | Schroder | June 30, 1931 |
| 2,581,667 | Joy | Jan. 8, 1952 |
| 2,625,376 | Smith | Jan. 13, 1953 |